(12) United States Patent
Ferron

(10) Patent No.: US 7,934,621 B2
(45) Date of Patent: May 3, 2011

(54) HANDLE OR GRIPPING IMPLEMENT FOR A COOKING VESSEL

(75) Inventor: Jacopo Ferron, Casalmaggiore (IT)

(73) Assignee: Ballarini Paolo & Figh S.p.A., Rivarolo Montovano (IT)

( * ) Notice: Subject to any disclaimer, the term of this patent is extended or adjusted under 35 U.S.C. 154(b) by 57 days.

(21) Appl. No.: 12/080,242

(22) Filed: Apr. 1, 2008

(65) Prior Publication Data

US 2008/0244863 A1 Oct. 9, 2008

(30) Foreign Application Priority Data

Apr. 4, 2007 (IT) .............................. MI2007A0696

(51) Int. Cl.
*B65D 25/28* (2006.01)
*A47J 27/00* (2006.01)
*A47J 36/00* (2006.01)

(52) U.S. Cl. ................. 220/755; 220/573.1; 16/425

(58) Field of Classification Search ............... 220/573.1, 220/752, 755; 16/421, 425
See application file for complete search history.

(56) References Cited

U.S. PATENT DOCUMENTS

| 2,478,784 | A | * | 8/1949 | Serio | 294/31.1 |
| 3,068,342 | A | * | 12/1962 | Jepson et al. | 219/436 |
| 6,010,030 | A | * | 1/2000 | St. John et al. | 220/752 |
| 6,257,439 | B1 | * | 7/2001 | Hsu | 220/759 |
| 6,959,469 | B2 | * | 11/2005 | Blauer et al. | 16/431 |
| 7,487,882 | B2 | * | 2/2009 | Ferron | 220/573.1 |
| 2004/0239836 | A1 | * | 12/2004 | Chase | 349/98 |
| 2006/0236522 | A1 | * | 10/2006 | Lin | 29/527.2 |

\* cited by examiner

*Primary Examiner* — Anthony Stashick
*Assistant Examiner* — Harry A Grosso
(74) *Attorney, Agent, or Firm* — Kirschstein, et al.

(57) ABSTRACT

A handle or gripping implement for a cooking vessel comprises two bottom and top handle elements to be mutually assembled to form the handle or cooking implement, the top element being made of a clear synthetic material and having a surface facing the bottom element, the bottom element including, in turn, a surface facing the top element, the surfaces of the top element and/or of the bottom element supporting wording, trademarks, patterns, colors or the like.

15 Claims, 2 Drawing Sheets

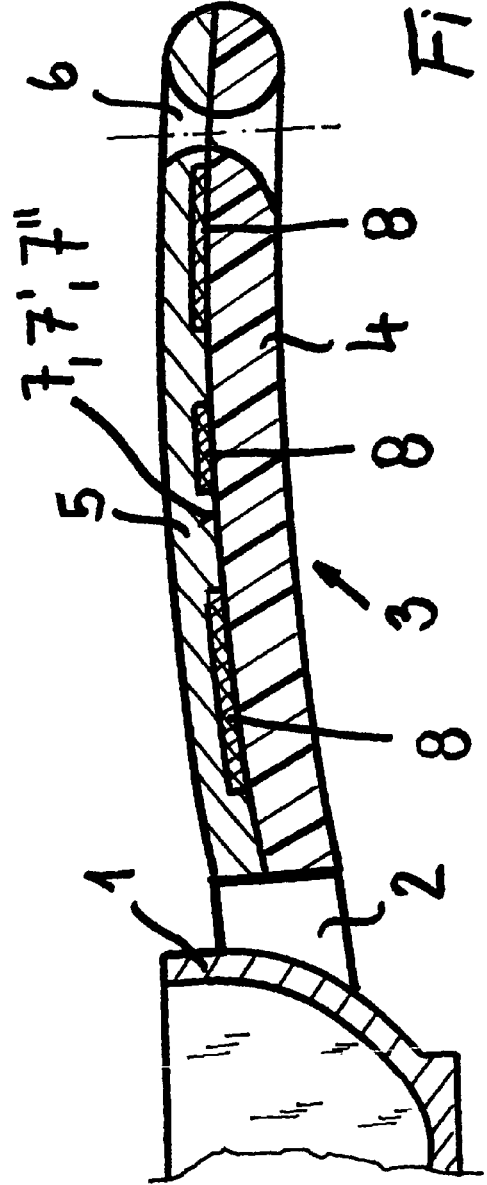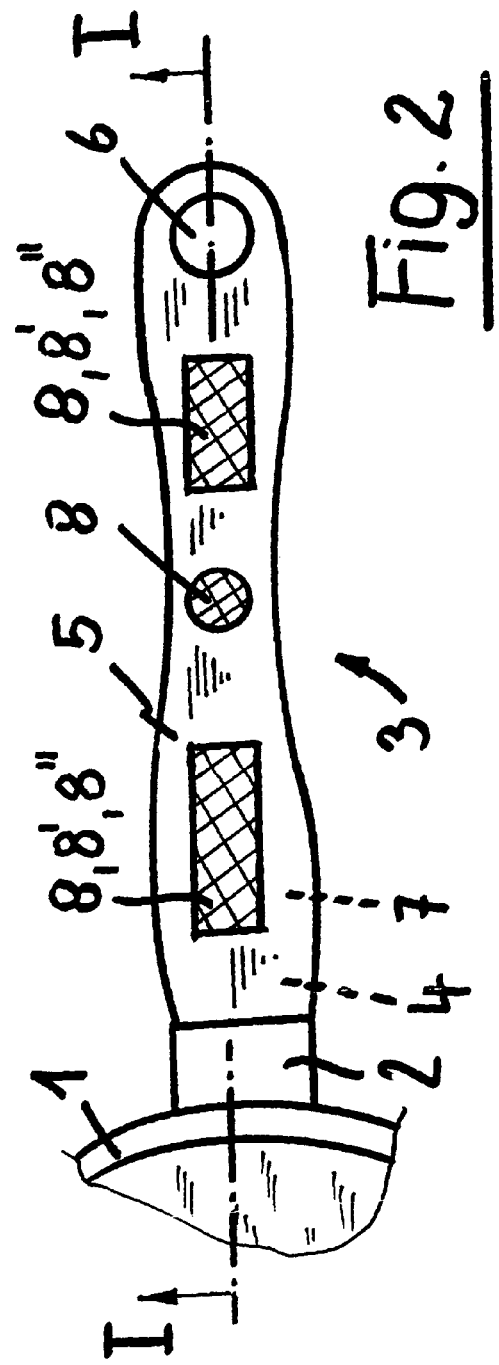

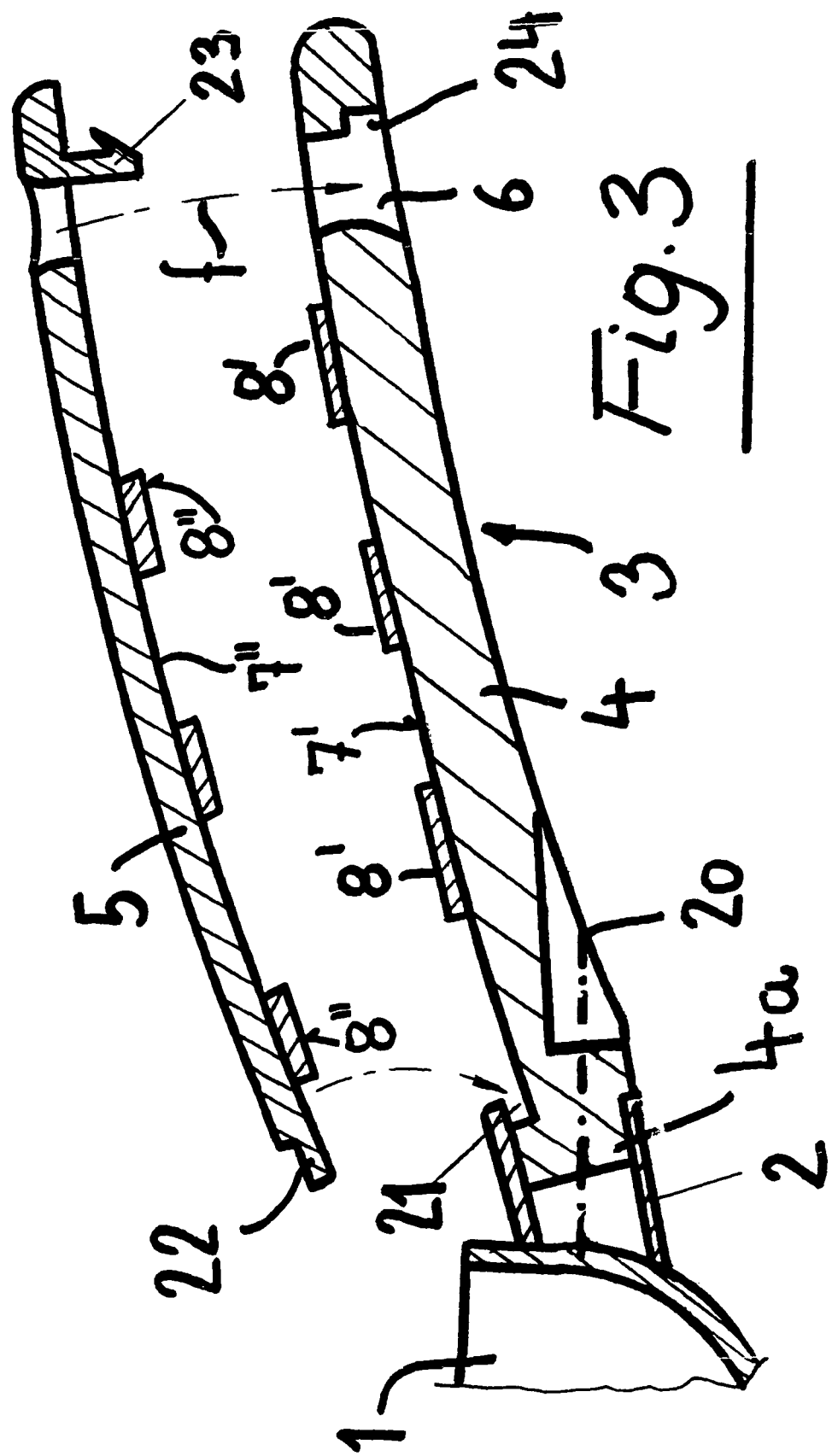

HANDLE OR GRIPPING IMPLEMENT FOR A COOKING VESSEL

BACKGROUND OF THE INVENTION

The present invention relates to a handle or gripping element for a cooking vessel.

Handles or gripping elements for cooking vessels made of two steel and wood pieces or two steel and thermosetting resin pieces are already known.

The above prior solutions are used since metal material gripping elements have the drawback of becoming greatly overheated in operation and, accordingly, for properly handling a kitchen or cooking vessel, a user must wear protective gloves, or other means for protecting his/her hands, such as protective cloth flaps.

A further prior solution provides to make the handle or gripping element to be used in a kitchen vessel of synthetic or resin material components, for example to make a part of the handle of a thermoinsulating phenolic resin, coupled with another part of the handle made of an acrylic resin. This prior solution represents a great improvement over a handle or gripping element made of steel; however, it has the disadvantage that the two shells forming the handle or gripping element must be necessarily assembled by using threaded screws and nuts engaged in suitable recesses formed in the handle or gripping implement components.

Both the above prior solutions have the further drawback that the mechanical components of the handle or gripping implement must be coupled to one another by screws and threaded nuts, or other like metal coupling means, thereby their making method is very complex and expensive.

Another prior solution for making a two-component handle provides to overmold on a steel material core a synthetic material shell made, for example, of a silicone material. While this method does not require screws and the like, it is objectable from a technical duration or life standpoint and represents a comparatively expensive approach.

Moreover, in prior handles, made of two mutually assembled handle portions, the surfaces defined by the two portions cannot be used for other useful purposes.

SUMMARY OF THE INVENTION

Accordingly, the aim of the present invention is to provide such a novel handle or gripping implement, including handle or gripping implement components having a bottom part and a top part including at least a surface thereof which can be used as a support for supporting wordings, trademarks, patterns or decorations which can be easily seen from the top of the handle.

The above aim is achieved by the fact that the handle or gripping implement according to the present invention is made of two bottom and top handle or gripping implement elements, to be mutually assembled to provide said handle or gripping implements, that said top element is made of a clear synthetic material, that said bottom element comprises a bottom surface facing the surface of said top element, that said bottom surface and/or top surface support wordings, trademarks, patterns, colors or the like.

The above wordings can also be obtained directly in the handle or gripping implement by a press molding operation. Thus, in the inventive composite handle or gripping implement, the surfaces of the two assembled components can also be advantageously used for supporting marks or wordings which can be easily seen by the cooking vessel user. Advantageously, the top part of the handle is coupled to the bottom part thereof by simple snap engaging connecting means.

Further advantages of the invention will become more apparent from the following disclosure, accompanying drawings and dependent claims.

BRIEF DESCRIPTION OF THE DRAWINGS

The subject matter according to the present invention will be disclosed in a more detailed manner hereinafter with reference to an embodiment thereof, given only by way of an example and being shown in the accompanying drawings, where:

FIG. 1 is a cross-sectional view, taken along the cross-section line I-I of FIG. 2, showing a pan handle;

FIG. 2 is a top plan view of the pan handle; and

FIG. 3 shows the two separated parts of the pan handle.

DESCRIPTION OF THE PREFERRED EMBODIMENT

As is shown in FIG. 1, a cooking pan 1 or the like vessel, therefrom a tubular flame protective element 2 projects, supports a handle, generally indicated by 3 and comprising a bottom handle part 4, made of a thermally resistant material, such as a well known phenolic resin, said bottom handle part being coupled to a handle top part 5, made of a clear and thermally resistant synthetic material.

The handle parts 4 and 5, before assembling the pan 1 handle 3 to the flame protective element 2, and before mounting the latter, are firmly assembled, for example by snap connection devices.

As is shown, said handle 3 further comprises an end throughgoing hole 6 for hanging up the pan 1.

On the joining region of the parts 4 and 5 of the handle 3, a flat surface 7, coated by a colored or metalized coating, for improving the decorating properties of the handle 3, is formed. Thus, it is easily possible to arrange on the flat surface 7, between the handle parts 4 and 5, several well defined regions 8 to support, for example, technical data related to the pan type, use instructions, maker trademarks, small patterns or decorations, such as small flowers or any other desired patterns.

Thus, owing to the convex configuration of the clear part 5 of the handle 3 an effect similar to that of a magnifying lens, facilitating the reading-out by a user, for example of legends 8 defining a written phrase will be achieved.

FIG. 2 is a top plan view of the handle 3, clearly showing the legends or wordings, graphic patterns or trademarks 8 applied on the flat surface 7 of the bottom 4 of the handle 3. In this connection, it should be apparent that the wordings or decorations 8 shown in FIGS. 1 and 2, having zones limited to the extension of the flat surface 7, can also have a size corresponding to the shape or configuration of the handle 3, to provide said handle 3 with a colored coating covering all the surface 7 of the handle 3.

In a very advantageous manner, the clear material of the handle 3 part 5 can also be slightly colored to improve the aesthetic effects of the handle 3.

A further advantage of the invention is that the bottom part 4 and/or top part 5 of the handle 3 are made of a synthetic material having an elastic property, thereby allowing the handle 3 to be safely gripped while providing a soft gripping feeling to the handle user.

Further advantageously, the coatings 8' and 8" on the surfaces 7' or 7" of the handle parts 4 and 5 are made by a tampograph process, and the wordings and/or patterns and/or decorations are applied on the handle surface 7' or 7" by transfer printing methods.

FIG. 3 shows the flame protective element 2, integral with the body of the pan, receiving the bottom part 4 of the handle 3, by clamping, in said protective element, by a clamping screw 20, an end portion 4a of the bottom part 4 of the handle. Moreover, between the top portion of the flame protective element 2 and the end portion 4a of the handle 3, a recess 21 for receiving a tapering part 22 of the handle part 5 is formed, thereby the front part of the handle 5 can be safely locked in position.

In assembling the handle, as the handle 3 top part 5 is lowered in the direction shown by the arrow (f), a lug 23, projecting from the rear of the part 5 will engage in an opening 6 of the handle bottom part 4, and snap herein on the rear of a stepped recess 24 thereof, thereby the bottom part 4 and top part 5 of the handle 3 will be firmly coupled to one another.

The invention claimed is:

1. A handle for a cooking vessel, comprising:
    an elongated bottom handle element of a heat-resistant material and connected to, and extending longitudinally away from, the vessel, the bottom handle element having an upper surface;
    an elongated top handle element of a heat-resistant, light-transmissive material and connected to, and extending longitudinally along, the bottom handle element, the top handle element having a convexly curved, magnifying, top surface and a lower surface that overlies the upper surface of the bottom handle element; and
    indicia on at least one of the upper and lower surfaces within the handle and visible as a magnified image through the convexly curved top surface of the top handle element.

2. The handle according to claim 1, and a hang-up hole extending through the connected bottom and top handle elements.

3. The handle according to claim 1, wherein the indicia includes a plurality of markings spaced longitudinally apart along the upper surface of the bottom handle element.

4. The handle according to claim 1, wherein the indicia includes a plurality of markings spaced longitudinally apart along the lower surface of the top handle element.

5. The handle according to claim 1, wherein the indicia includes a plurality of markings spaced longitudinally apart along both the upper surface of the bottom handle element and the lower surface of the top handle element.

6. The handle according to claim 1, wherein the upper and lower surfaces are in surface area contact with each other.

7. The handle according to claim 1, and a colored coating on at least one of the upper and lower surfaces.

8. The handle according to claim 1, wherein the light-transmissive material of the top handle element is colored.

9. The handle according to claim 1, wherein the materials of the bottom and top handle elements are synthetic, elastic materials.

10. The handle according to claim 1, wherein the indicia is printed on at least one of the upper and lower surfaces.

11. The handle according to claim 1, wherein the indicia is coated on at least one of the upper and lower surfaces.

12. The handle according to claim 1, wherein the indicia is molded into at least one of the upper and lower surfaces.

13. The handle according to claim 1, wherein the indicia includes at least one of text and graphics.

14. The handle according to claim 1, wherein the bottom handle element has an end region inserted into a tubular, flame-protective element projecting away from the vessel, and wherein the end region of the bottom handle element bounds a recess with the flame-protective element; and wherein the top handle element has an end region formed with a projection that is received in the recess upon connection of the handle elements.

15. The handle according to claim 14, wherein the opposite end region of the top handle element has an elongated latch, and wherein the opposite end region of the bottom handle element has a hole through which the latch extends with a latching action upon connection of the handle elements.

* * * * *